United States Patent [19]
Löbert

[11] Patent Number: 5,480,110
[45] Date of Patent: Jan. 2, 1996

[54] TRANSPORT PLANE WITH STUB TAIL

[75] Inventor: Gerhard Löbert, Baldham, Germany

[73] Assignee: Daimler-Benz Aerospace AG, Munich, Germany

[21] Appl. No.: 218,057

[22] Filed: Mar. 25, 1994

[30]     Foreign Application Priority Data

Mar. 27, 1993 [DE]  Germany ........................... 43 10 017.1

[51]  Int. Cl.⁶ ........................... B64D 27/02; B64C 21/02; B64C 21/06
[52]  U.S. Cl. ..................... 244/130; 244/53 B; 244/23 R; 244/204; 244/209
[58]  Field of Search ............................. 244/53 B, 123 R, 244/23 D, 45 R, 200, 204, 209, 130

[56]     References Cited

U.S. PATENT DOCUMENTS

| | | | |
|---|---|---|---|
| 2,399,839 | 5/1946 | Vorse | 244/23 R |
| 3,289,977 | 12/1966 | Staats | 244/23 R |
| 3,317,162 | 5/1967 | Grant | 244/204 |
| 3,633,848 | 1/1972 | Fimml | |
| 3,887,147 | 6/1975 | Grieb | |
| 4,033,526 | 7/1977 | Benson | 244/209 |
| 4,643,268 | 2/1987 | Jones et al. | 244/23 R |
| 5,016,837 | 5/1991 | Willis | 244/23 R |
| 5,114,097 | 5/1992 | Williams | 244/119 |
| 5,299,760 | 5/1994 | Finch et al. | 244/53 B |
| 5,368,258 | 11/1994 | Johnson et al. | 244/209 |

FOREIGN PATENT DOCUMENTS

| | | |
|---|---|---|
| 906660 | 3/1954 | Germany . |
| 1481622 | 1/1970 | Germany . |
| 1900380 | 11/1970 | Germany . |
| 1041048 | 9/1966 | United Kingdom . |

Primary Examiner—Andres Kashnikow
Assistant Examiner—Virna Lissi Mojica
Attorney, Agent, or Firm—McGlew and Tuttle

[57]     ABSTRACT

A transport plane with stub tail, which is preferably propelled by two jet engines. The intake air is fed to the engines directly integrated in the fuselage tail via a diffusor, the diffusor is a short diffusor. The air obtained by boundary layer suction via a suction slot with a combination of ejectors and diffusors is fed into the rest of the intake air.

10 Claims, 3 Drawing Sheets

5,480,110

TRANSPORT PLANE WITH STUB TAIL

FIELD OF THE INVENTION

The present invention pertains to a transport plane with stub tail, which is preferably propelled by two jet engines, wherein the intake air is fed to the engines directly integrated in the fuselage tail via a diffusor.

BACKGROUND OF THE INVENTION

Such airplanes with stub tail have been known from several documents. U.S. Pat. No. 5,114,097 discloses a passenger airplane with two engines integrated in the fuselage tail, which receive their intake air via an air inlet arranged on the top side of the fuselage. The air taken in is fed to the engines via a long diffusor. According to British Patent No. GB 1,041,048, the intake air for two engines located in the fuselage tail flows through inlets arranged in the form of ears on the fuselage and is then sent into diffusor channels. A tailless STOL aircraft, in which the intake air is fed to the two engines through long channels, is described in U.S. Pat. No. 4,033,526. German Offenlegungsschrift No. DE-OS 1,900,380 discloses an intake diffusor for a central jet engine integrated in the fuselage tail. The feeding of the intake air via long diffusors for two engines installed directly in the fuselage tail in large-capacity airplanes, which are also to be used as transport planes, has been known from German Offenlegungsschrift No. DE-OS 1,481,622.

All the airplanes described in the above-mentioned documents have essentially conventional configurations with long diffusors led through the fuselage tail for guiding the intake air for the engines. Even though these airplanes have less resistance due to the integration of the engines within the tail than those with engines arranged outside on the tail, they generally have the disadvantage that the tail terminates with relatively little space, and therefore it can hardly be used for receiving payload.

To reduce the air resistance of an airplane, it has furthermore been known from German Patent No. DE-PS 906,660 that the boundary air layer is completely drawn off. This boundary air layer is carried on the outer surfaces of the parts of the: airplane exposed to the relative wind (wings, fuselage) in the direction of movement due to friction, and its relative velocity in relation to that of the airplane is reduced as a result.; The drawn off boundary air layer is fed to the devices to be fed with air (e.g., compressors of jet engines). The figures represented in the document show engines arranged as a whole in the front part of the fuselage or on the airfoils and a considerable expense for the devices would be encountered for implementing such a design.

SUMMARY AND OBJECTS OF THE INVENTION

The primary object of the present invention is to design a transport plane of the type described in the introduction, which is designed as an airplane of lower resistance due to a new configuration of both the tail and the guidance of the intake air for the engines.

This object is attained by providing a transport plane or similar airplane with a stub tail, the plane being provided with two jet engines for propulsion. The jet engines are directly integrated in the fuselage tail. An air intake is provided adjacent to the tail for feeding air to the engine via a short diffuser. The short diffuser is characterized by a length from an air intake surrounding the jet engines at the tail to a location just at the interior of the tail. A suction slot is provided in the fuselage surface adjacent to the tail to obtain air by boundary layer suction means. The boundary layer suction slot is provided with a combination of ejectors and diffusors in the fuselage tail area wherein air obtained by boundary layer suction is fed into the remainder of the intake air.

The short diffuser is arranged around the two engines and is provided with guide surfaces. The diffuser extends from the intake air feed (around the jet engines) at the fuselage tail interiorly to deflecting grids wherein air obtained by boundary layer suction is fed into the intake air.

The boundary layer suction slot provides removal of the boundary, layer from the outer flow via an outer lip, which is placed along the fuselage tail upstream of the short diffuser. The intake air is fed into the ejectors and diffusors via pressure channels and ejector nozzles. Bypass airflow, of a separate bypass gas generator, is fed into the ejector nozzles. The ejector nozzles open into suction slots drawing off the boundary layer and the suction slots are used as ejectors in a first part and then expanded into the diffusors. One suction slot and one pressure channel each are located in the upper and lower parts of the fuselage tail. Intake air arriving from the air intake via the short diffusors and the diffusors of the boundary layer suction slot is guided through two deflecting grids before it enters the engines. The entire air flow drawn in is fed after being processed in the engines to thrust vectoring nozzles.

The complete integration of the fuselage and the propulsion unit due to the installation of the engines in the fuselage tail and the taking in of the aft flow leads in several respects to a considerable increase in propulsive efficiency, because the thrust is generated by the acceleration of the masses of air which had previously been decelerated by friction on the surface of the fuselage. Furthermore, this fuselage/engine arrangement makes it possible, if the fuselage tail is designed skillfully, to considerably increase the relative thickness and to reduce the length of the fuselage, and thus it leads to a reduction in the air-swept surface and in the weight of the fuselage at a predetermined fuselage volume.

Another favorable effect of such an increase in the relative thickness of the fuselage is the reduction of the air-swept surface of the wing at a predetermined wing span. If furthermore, the drive unit is provided with one or more two-axis thrust vector nozzles, the size of the elevator unit and of the rudder unit can be reduced considerably. All these advantages lead to a smaller and lighter vehicle at a predetermined payload and range and to a substantial reduction in the specific cost of transportation.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

ANALYSIS OF THE STATE OF THE ART

Figure 1:
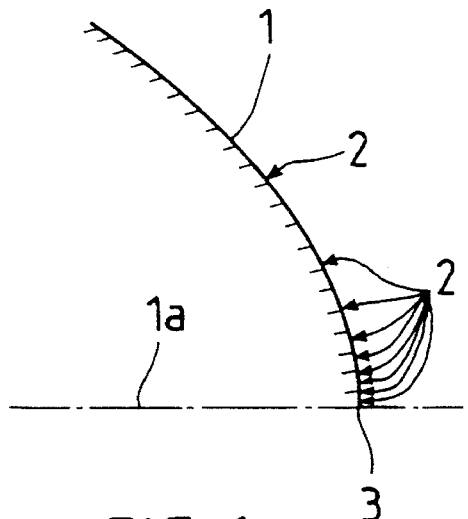
FIG. 1 is a view showing possible suction slots on a stub fuselage tail with separation-free flow according to the state of the art.

FIG. 1 shows, for a section through a stub tail 1, the necessary arrangement of suction slots 2 to achieve a separation-free boundary layer flow. It is assumed here that the boundary layer is able to overcome an increase in pressure of 40% of the initial dynamic pressure without separating. Since the increase in pressure that can actually be overcome decreases, in a first approximation, in proportion to the second power of the velocity of flow occurring directly downstream of the suction slots 2, the clustering of the suction slots 2 in the area around the rear stagnation point 3 increases progressively. Another means of preventing flow separation would have to be found there.

Figure 2:
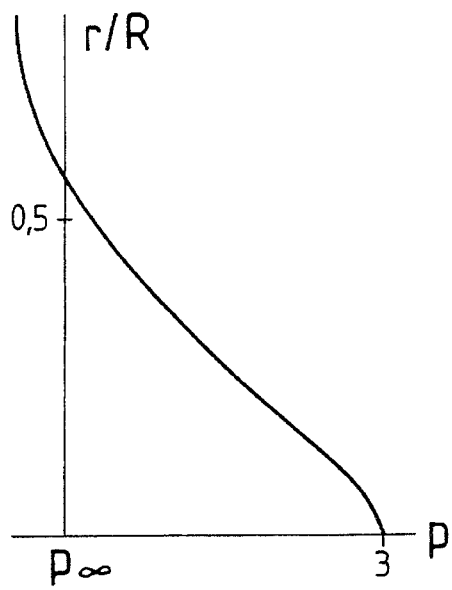
FIG. 2 is a diagram showing the pressure curve of the boundary layer on the fuselage tail according to FIG. 1.

FIG. 2 shows the actual pressure p as a function of r/R for the separation-free boundary layer on the tail 1 according to FIG. 1. Here, r is the radial distance between the axis 1a and the tail 1, and R is the greatest corresponding distance. The value for the pressure in the free flow is at the intersection of the ordinate r/R with the abscissa p at $p_\infty$. It can be recognized that the aft flow on the tail 1 forms a boundary layer, which has to bear a considerable increase in pressure without separation. The highest pressure p occurs, of course, at the stagnation point 3.

DETAILED DESCRIPTION OF THE PREFERRED EMBODIMENT

Figure 3:
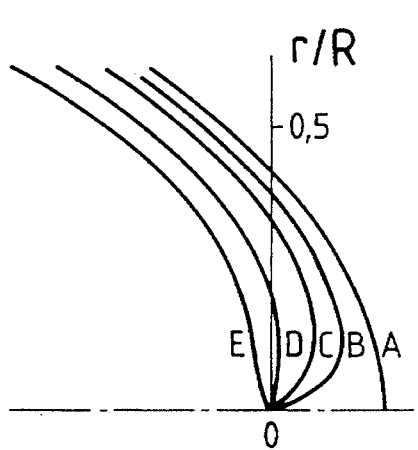
FIG. 3 is a diagram showing streamline curves for stub fuselage tails, in the rear end of which a flow sink is recessed.
Figure 4:
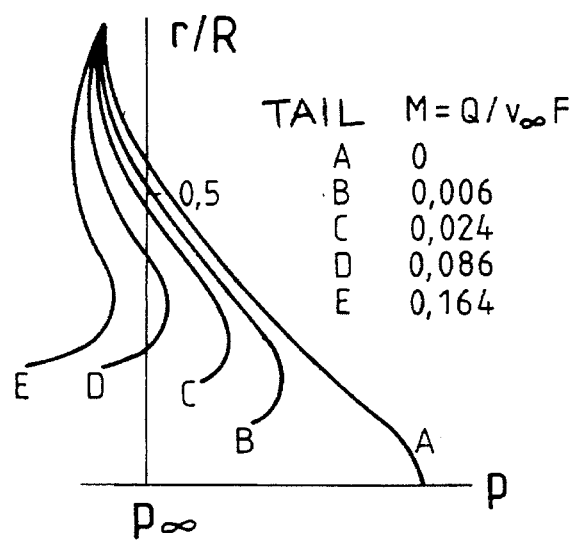
FIG. 4 is a diagram showing pressure distributions on the tail surface for a stub fuselage tail according to FIG. 3.

FIG. 3 shows the streamlines A through E for a stub fuselage tail, in the rear end of which a flow sink is recessed at 0. The tail contours A through E represented are again shown as a function of r/R. The different tail contours and tail pressure distributions according to FIG. 4 are obtained, depending on the volume flow Q of the air taken in from behind. The contour designated by A represents the reference case without tail suction corresponding to FIGS. 1 and 2. In the case of suction, a funnel-shaped recess is formed in the fuselage tail. The opening angle of the funnel increases with increasing relative amount of suction, $M=Q/v_\infty \cdot F$, while the curvature of the contour section joining it decreases progressively. In the equation, $v_\infty$ is the velocity of flow during free flow, and F is the front area of the fuselage.

FIG. 4 shows the pressure distributions on the tail surface A through E. As can be recognized, the central tail suction leads to the actual boundary layer on the tail surfaces B through E having to overcome a substantially smaller increase in pressure than in the reference case A. The increase in pressure to be overcome decreases progressively with increasing amount of suction M of the sink, and it should be minimized without having to provide suction too intensely. The necessary amounts of suction M to achieve the pressure distributions A through E represented are shown in dimensionless values for the individual tail contours A through E according to FIG. 3 in the table belonging to FIG. 4. The amount of suction of the engine has a certain value, which must be coordinated with the possible amount of suction M of the sink. This leads in practice approximately to the tail contour B.

Figure 5:
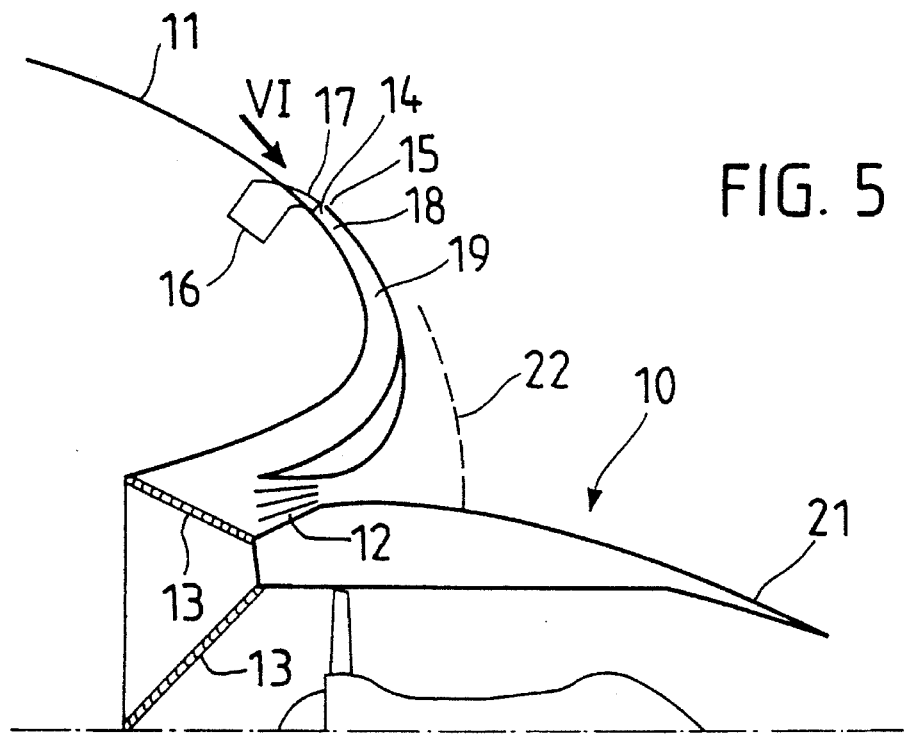
FIG. 5 is a cross sectional view showing a practical embodiment of an integrated boundary layer-control propulsion unit.

FIG. 5 shows schematically a half section of a practical embodiment of the integrated boundary layer-control drive unit with a bypass engine 10, which is mounted on a fuselage tail 11. The air arriving in the inner region of the fuselage tail 11 is fed into a short diffusor 12 (i.e. a diffuser having a length from a funnel shaped recess formed in the fuselage tail, arranged around the jet engines, to the feed in of the bypass engine 10, directly integrated in the fuselage tail) provided with guide surfaces, and it is decelerated to ca. 0.4 $V_\infty$ there. The air is subsequently deflected in two deflecting grids 13 and is fed into the bypass engine 10. Since a great pressure difference is still to be overcome in the case of the contour of the fuselage tail 11 (cf. FIG. 4, line B), a boundary layer control via a suction slot 14 is still necessary. The boundary layer, which is removed upstream from the outer flow by an outer lip 15 of the suction slot 14, is fed into an ejector-diffusor combination, consisting of a pressure channel 16, an ejector nozzle 17, an ejector 18, and a diffusor 19, where it is brought to the total pressure and to the velocity of flow of the air flow drawn in via the short diffusor 12 in the inner region of the tail. The boundary layer thus processed is then fed to the engine 10 through the deflecting grid 13. The entire air flow drawn in the tail region is fed, after being processed in the turbojet engines 10, to a bypass thrust vectoring nozzle 21 each. These nozzles 21, operated via a fail-safe flight control system, make it possible to considerably reduce the size of the conventional elevator units and rudder units necessary for the pitch axis and the yaw axis. The broken line 22 shows the boundary stream surface of the air flow entering the engines. It should be borne in mind that a stagnation line extending at right angles to the direction of flight develops on the surface of the engines 10 around the engine cowling. The frictional resistance is correspondingly low in this area.

Figure 6:
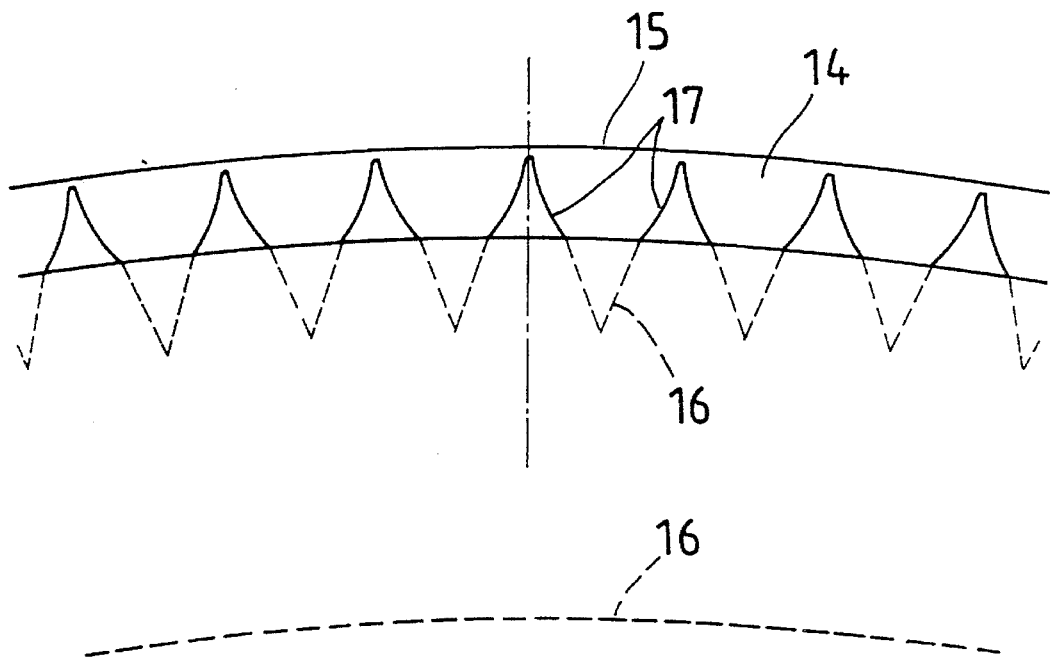
FIG. 6 is a view in direction VI of FIG. 5.

FIG. 6, which represents a view in direction VI from FIG. 5, is a view toward the outer lip 15 of the suction slot 14 and toward the ejector nozzles 17, which are arranged on a curved arc around the fuselage tail 11. The ejector nozzles 17 have such an outlet cross section that the transverse distribution of the outlet momentum approximately corresponds to the transverse distribution of the density of the momentum loss of the boundary layer. The compressed air for the ejector nozzles 17 is passed through the pressure channel 16 and is generated in one or more separate bypass gas generators (not shown).

Figure 7:
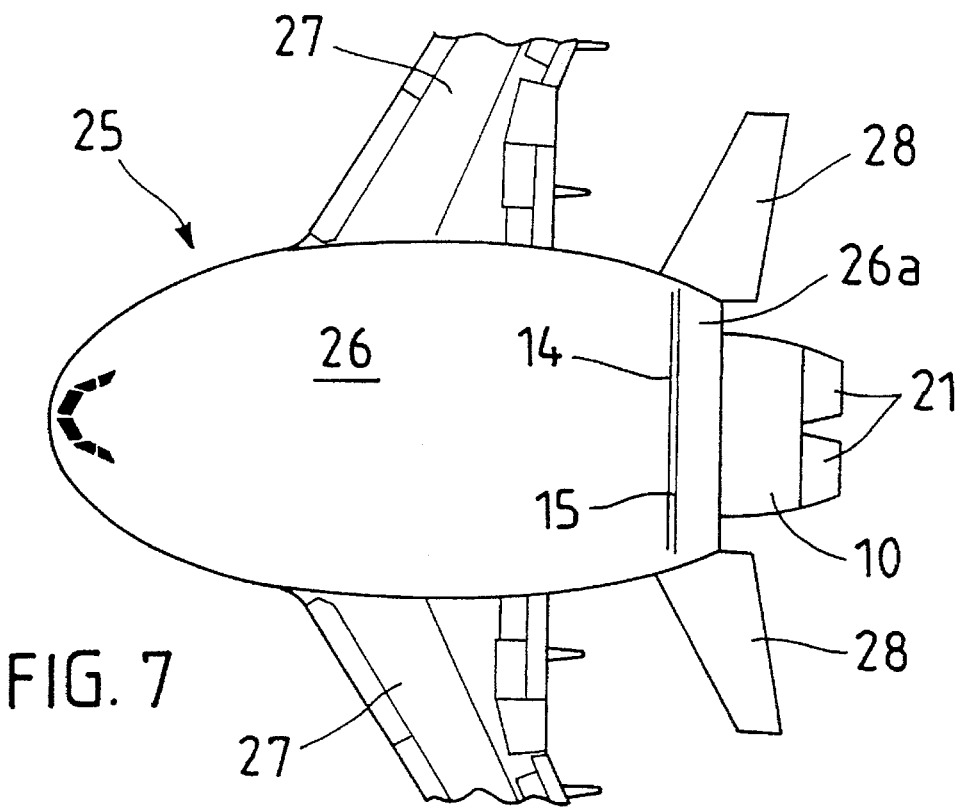
FIG. 7 is a top view of an embodiment of a transport plane with the boundary layer-control propulsion unit according to FIG. 5.
Figure 8:
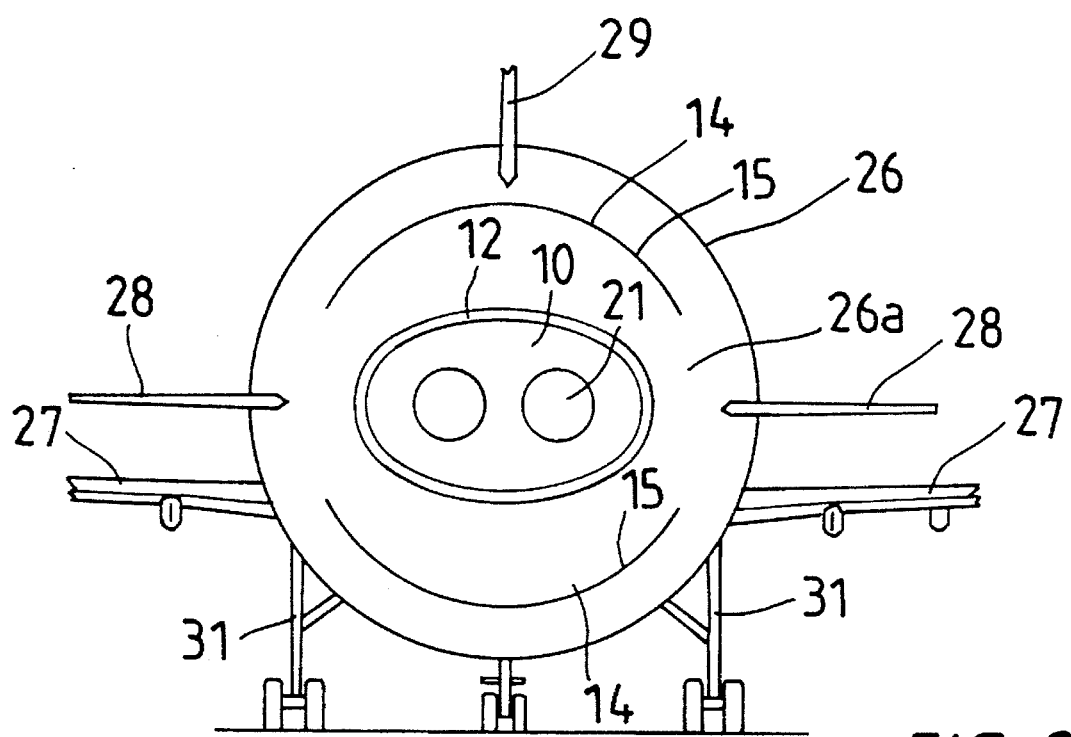
FIG. 8 is a rear end view of the tail of the transport plane according to FIG. 7.

FIGS. 7 and 8 show the top view and the tail view of a transport plane 25, which is equipped with the integrated boundary layer-control propulsion unit. It is provided with a large-volume fuselage 26 for transportation purposes. The two outer lips 15 and the suction slots 14 are represented in top and bottom on the fuselage tail 26a, which corresponds to the fuselage tail 11 according to FIG. 5. The suction slots 14 may be omitted in the lateral area because of the slight contraction of the fuselage tail 26a in that region. The figures also show the engines 10 with the thrust vectoring nozzles 21 as well as the wing 27, elevator control 28, rudder unit 29, and the landing gear 31. The short diffusor 12, arranged around the engines 10, is also shown in FIG. 8. The structure weight, the fuel consumption, and the take-off weight can be markedly reduced due to the configuration of the transport plane 25 shown compared with the conventional airplanes with slender fuselage and arrangement of the engines in the wing.

While a specific embodiment of the invention has been shown and described in detail to illustrate the application of the principles of the invention, it will be understood that the invention may be embodied other, vise without departing from such principles.

What is claimed is:

1. Transport plane with stub tail, comprising:

jet engines directly integrated in a fuselage tail of the plane;

an air intake formed along the fuselage tail;

a short diffuser connected between said air intake and said jet engines; and boundary layer suction slot means, said boundary layer suction slot means including a combination of ejectors and diffusors in the fuselage tail, said suction slot means obtains boundary layer air from the boundary layer which is associated with said suction slot means, and said suction slot boundary layer air feeding into intake air which is derived from said air intake to form combination air feeding into said jet engines.

2. Transport plane according to claim 1, wherein:

said short diffuser is arranged around said jet engines and is provided with guides surfaces.

3. Transport plane according to claim 1, wherein:

said boundary layer suction slot means removes the boundary layer from an outer flow via an outer lip of a suction slot, said suction slot being located along said fuselage tail, upstream of said short diffuser.

4. Transport plane according to claim 1, wherein:

said boundary layer suction slot means feeds intake air into said ejectors and diffusors via pressure channels and ejector nozzles.

5. Transport plane according to claim 4, wherein:

a separate bypass gas generator is provided and bypass airflow of said separate bypass gas generator is fed to said ejector nozzles.

6. Transport plane according to claim 3, wherein:

said ejector nozzles open into suction slots drawing off said boundary layer, and suction slots are provided with ejectors in a first part of said boundary layer suction slot means and subsequently expand into said diffusors.

7. Transport plane according to claim 4, wherein:

said ejector nozzles open into suction slots drawing off said boundary layer, and suction slots are provided with ejectors in a first part of said boundary layer suction slot means and subsequently expand into said diffusors.

8. Transport plane according to claim 1, wherein:

said suction slot means includes one suction slot and one pressure channel, each located in an upper part of said fuselage tail and each being located in a lower part of said fuselage tail.

9. Transport plane according to claim 1, further comprising:

two deflecting grids for conditioning air arriving from said short diffuser and said diffusors of said boundary layer suction slot means.

10. Transport plane according to claim 1, further comprising:

thrust vectoring nozzles connected to said engines.

* * * * *